Feb. 9, 1937.   H. C. MARMON ET AL   2,070,289
MOTOR VEHICLE
Original Filed Jan. 31, 1933   4 Sheets-Sheet 1
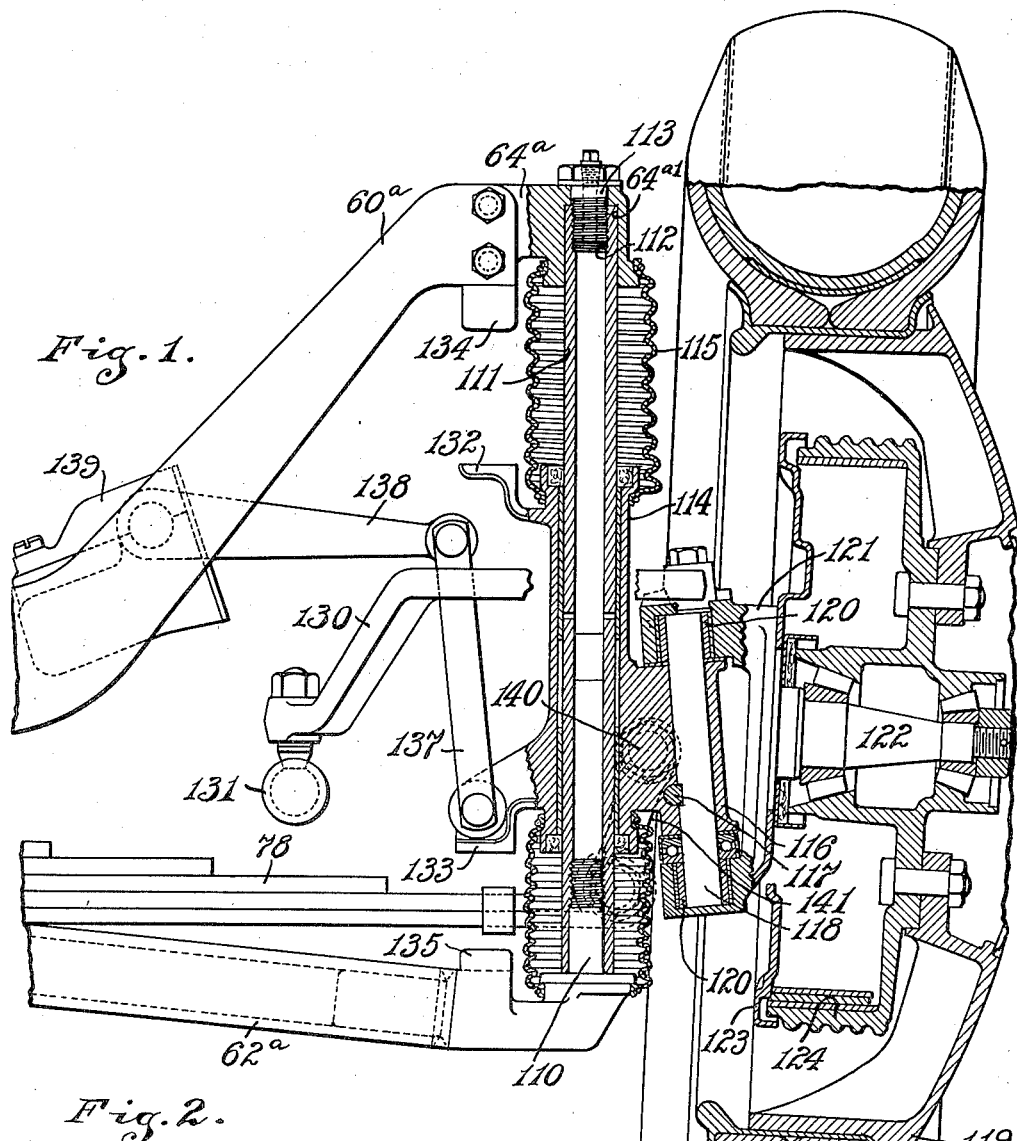
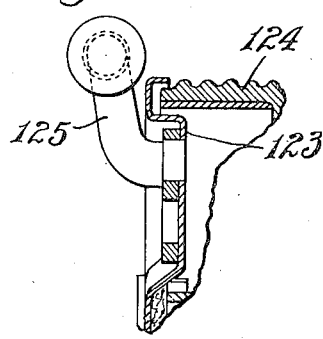
INVENTORS
Howard C. Marmon and
George H. Freers,
BY
Hood & Hahn
ATTORNEYS

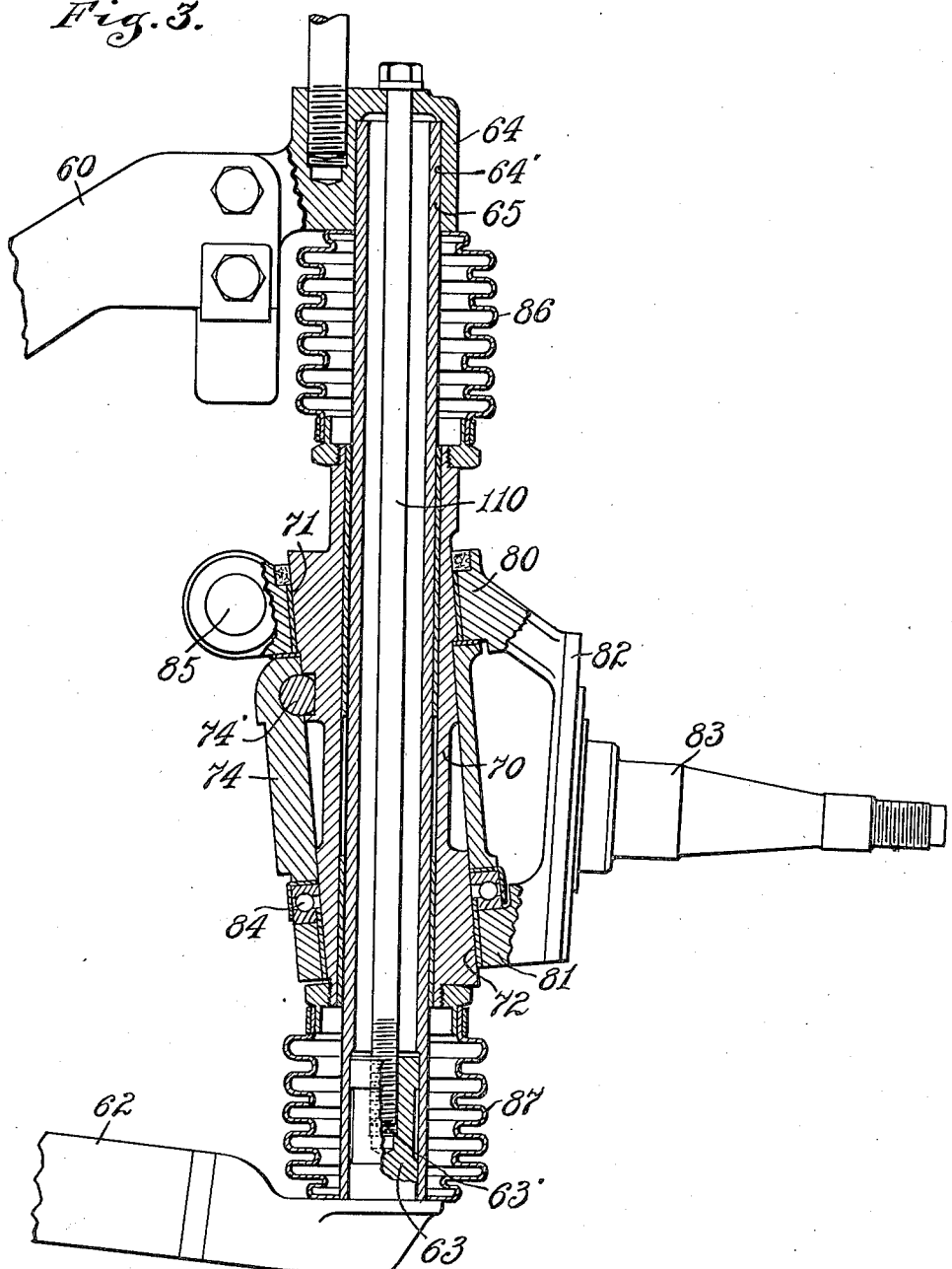

Feb. 9, 1937.　　H. C. MARMON ET AL　　2,070,289
MOTOR VEHICLE
Original Filed Jan. 31, 1933　　4 Sheets-Sheet 3
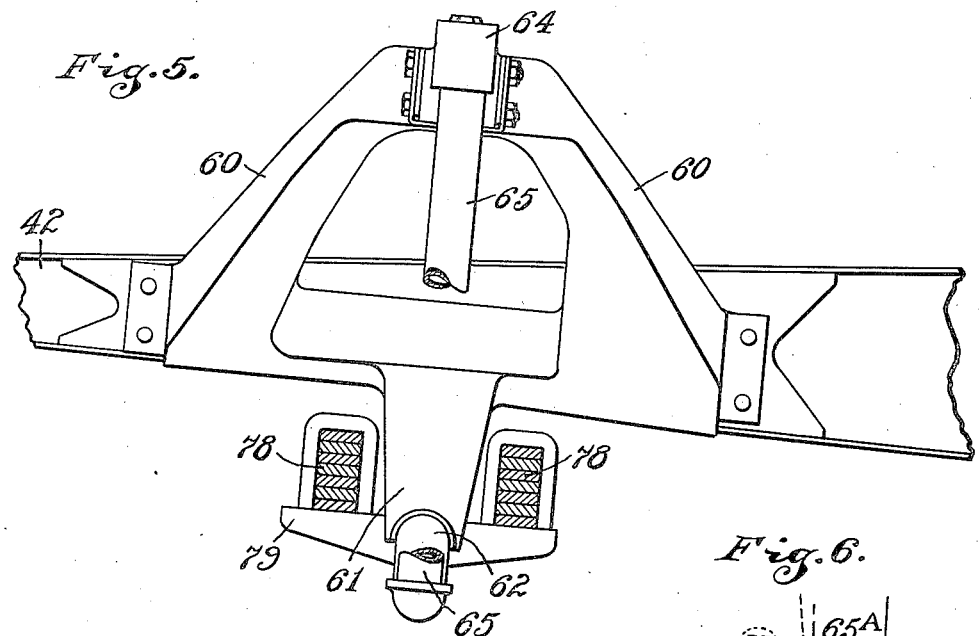
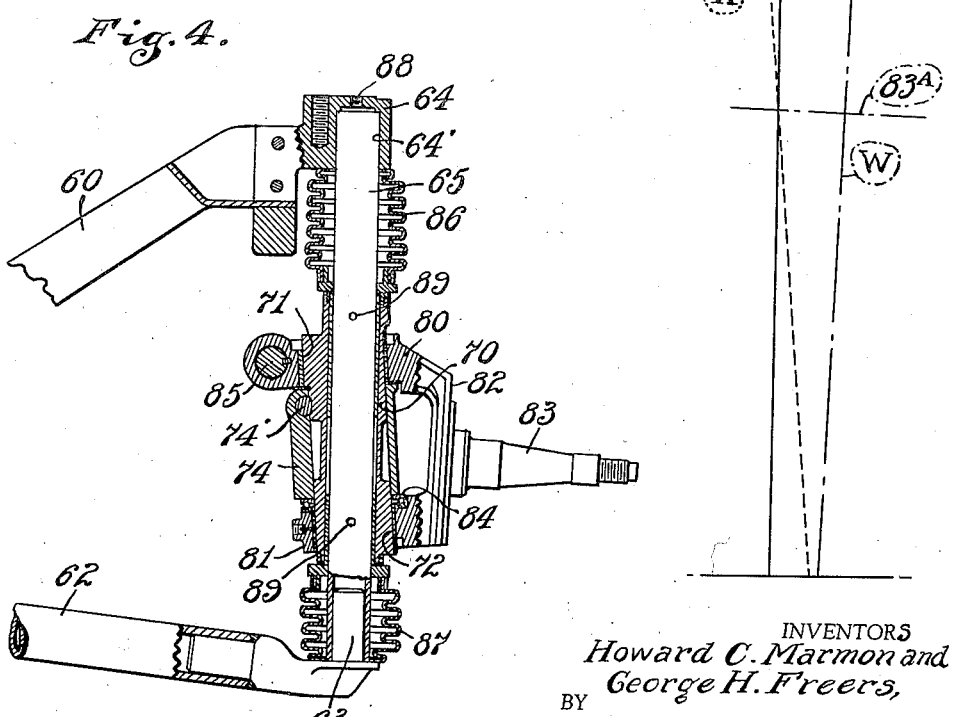
INVENTORS
Howard C. Marmon and
George H. Freers,
BY Hood & Hahn
ATTORNEYS

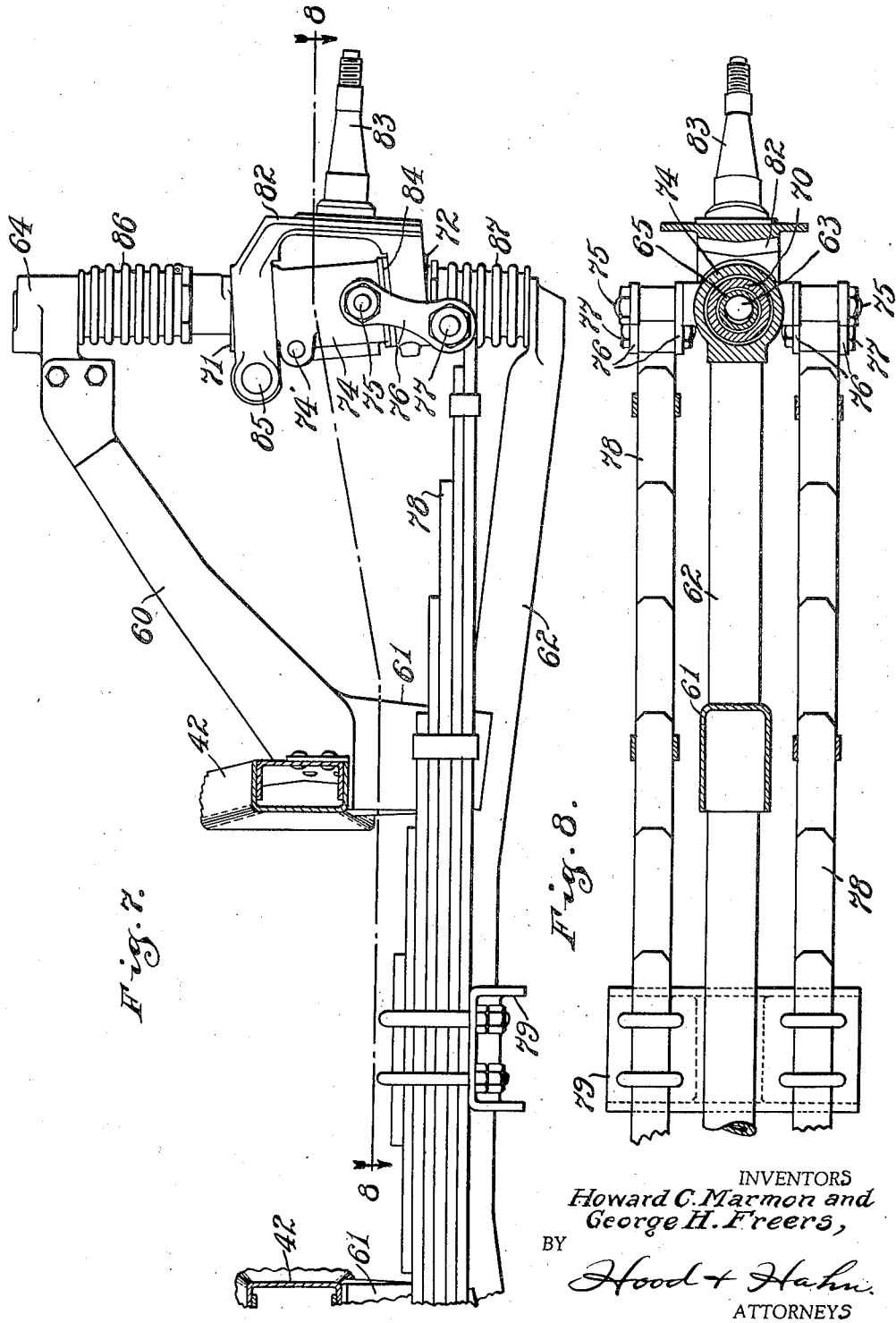

Patented Feb. 9, 1937

2,070,289

UNITED STATES PATENT OFFICE 2,070,289

MOTOR VEHICLE

Howard C. Marmon and George H. Freers, Indianapolis, Ind.; said Freers assignor to said Marmon Original application January 31, 1933, Serial No. 654,368. Divided and this application November 20, 1933, Serial No. 698,754

12 Claims. (Cl. 280—96.2)

The object of our invention is to provide certain improvements in details of automobile construction, more particularly in the details of front wheel mounting by which the two front wheels are independently sprung and so guided that no lateral slippage of the wheels results from vertical movement of the chassis frame relative to those wheels.

The connection between the front wheels and the main frame of the chassis is also such as to provide maximum ease of steering consistent with stability.

The accompanying drawings illustrate our invention:

Fig. 1 is a vertical section of a front wheel mounting, embodying our invention, which has been proven to be satisfactory;

Fig. 2 is a fragmentary horizontal section of a portion of the structure shown in Fig. 1, showing the stretcher rod arm attached to the backing plate for the brake drum;

Fig. 3 is a vertical section of another form of front wheel mounting embodying our invention;

Fig. 4 is a vertical section, on a smaller scale, of another form of our invention;

Fig. 5 is a fragmentary side elevation, in partial vertical section, of that portion of the forward end of the chassis frame immediately adjacent one of the front steering wheels;

Fig. 6 is a diagram showing the relation of one of the front wheels to the ground and its vertical axis;

Fig. 7 is a fragmentary front elevation in partial vertical section of one front corner of our chassis frame and associated steering wheel knuckle; and Fig. 8 is a section on line 8—8 of Fig. 7.

In the drawings, 42, 42 indicate the side bars of the chassis frame, these bars being of the usual channel form.

Secured to each channel 42, near its forward end, is a bracket comprising outwardly and upwardly extending converging arms 60, 60 and a depending lug 61. Bridging and detachably secured to arms 60 is a bracket 64 having a downwardly-presented pocket 64'. Secured to the two lugs 61 is a cross-bar 62 each end of which carries an upwardly-presented pin 63 in alinement with the downwardly-presented pocket 64'. Seated in pocket 64' and sleeved over the subjacent pin 63 is a tubular king-pin 65. The axes of the two king-pins 65 are parallel with each other but their upper ends are inclined slightly rearwardly.

Slidably mounted on each king-pin is a bearing sleeve 70 having upper and lower knuckle bearings 71 and 72, the axis of which, X, (Fig. 6) is transversely inclined to the axis of the king pin. Sleeved over sleeve 70, but non-rotatively secured thereto by pin 74' is a shackle sleeve 74 to which are pivoted, at 75, two shackle links 76, 76, respectively, pivoted at 77, 77 to the outer ends of the two parallel springs 78, 78 secured to bracket 79 carried by cross-rod 62 at its middle.

Journaled on the two knuckle bearings 71 and 72 respectively, are the two bearing eyes 80 and 81 of the steering wheel knuckle 82 which carries the wheel-spindle 83. The thrust bearing 84 is interposed between the lower end of sleeve 74 and the lower knuckle bearing 72.

Secured to the upper bearing eye 80 is an arm 85 connected by the usual stretcher bars and links (not shown) to the steering post.

Flexible bellows 86 and 87 are connected respectively with the upper and lower ends of sleeve 70 and to the arms 60 and 62. An oiling opening 88 affords access to the interior of the king-pin and suitable openings 89 through the wall of the pin afford proper lubrication for the vertical sliding of sleeve 70 upon the king-pin.

The axis 65A (Fig. 6) is in a vertical plane; the axis 83A of spindle 83 is inclined outwardly and downwardly so that the medial plane W of the steering (front) wheel will intersect the ground about 2 inches outside the ground intersection of the king-pin plane; and the axis X of bearings 71 and 72 intersects the axis 65A of the king-pin at the intersection of axis 83A therewith and intersects the ground a little short of midway between the intersections with the ground of axis 65A and plane W. In practice it has been found that this arrangement insures ease of steering without too great a drag and with sufficient stability, while at the same time insuring against the development of any lateral stresses on the steering wheels at their ground contacts due to vertical movements of the king-pins and chassis frame accompanying flexing of the front springs.

The construction shown in Fig. 3 is quite similar to that shown in Fig. 4 and similar parts are similarly numbered. In this form the outer ends of arms 60 and 62 are tied together by a bolt 110 which passes down through bracket 64 and the tubular king-pin 65 and enters a threaded pocket 63' in pin 63.

Referring now to Figs. 1 and 2. Parts 60a, 62a and 64a correspond, respectively, to parts 60, 62, and 64 in other figures. Arm 62a at its outer end carries the upwardly-presented pin 110 threaded at its upper end. Sleeved over, and threaded on, pin 110 is the guide tube 111, internally threaded at its upper end at 112, and seated in the pocket 64a' of bracket 64a. Bolt 113 passes down through bracket 64a and is threaded into threads 112, so that the parts are firmly connected.

Vertically slidable on tube 111 is a sleeve 114 and the spaces between the ends of this tube and the supporting structure are bridged by the dirt-excluding bellows 115.

Sleeve 114 comprises an outwardly projected arm 116, which is secured, by the cam-bolt 117, a non-rotatable king-pin 118 the ends of which project above and below the arm 116. The axis of king-pin 118 is inclined inwardly and upwardly relative to the axis of the guide tube 111 and the pin is so placed and inclined that its axis, extended downwardly, will intersect the ground slightly inside of the point of intersection of the medial plane of the wheel 119 with the ground.

Journaled upon the projected ends of king-pin 118, by suitable interposed anti-friction bearings 120, and straddling arm 116, is the spindle yoke 121 which carries the outwardly projected and slightly downwardly inclined wheel spindle 122, upon which the wheel 119 is journaled.

Secured to yoke 121 is a circular backing plate or cover plate 123 which serves as a guard for the open inner end of the brake drum 124, carried by wheel 119, and secured to this plate is a stretcher rod-arm 125 to which a stretcher rod, not shown, extending between the two front wheels, may be connected. Secured to the upper end of yoke 121 is an arm 130 to which the steering rod 131 is connected.

Sleeve 114 is provided near its upper and lower ends with inwardly-projecting portions 132 and 133 adapted, upon extreme sliding movements of the sleeve, to respectively engage bumper cushions 134 and 135 respectively, carried respectively by the arms 60a and 62a.

Projection 133 serves as a convenient anchorage for one end of link 137, the opposite end of which is connected to lever 138 of a shock absorber 139 of well-known form attached to arm 60a.

Pivoted at 140 to the front and rear faces of arm 116, on an axis substantially midway between the axes of guide tube 111 and king-pin 118, are two links (spring shackles) 141, only one being shown in Fig. 1, and the lower ends of these links are pivotally connected respectively to the outer ends of the two front springs 78.

The construction shown in Fig. 1, while in many respects substantially the same as those shown in Figs. 3 and 4, is somewhat less expensive to build and may more conveniently incorporate anti-friction bearings between the spindle knuckle and the vertically sliding sleeve upon which the knuckle is swiveled. The suspension of the outer ends of the springs between the two shackle links holds the sleeve 114 against rotation about guide tube 111 and, as the axis of the pivotal connection between the upper ends of the shackle links and sleeve 114 is midway between the inclined axis of the king-pin and the sliding axis of the sleeve, tendency of applied loads to cant the sleeve 114 relative to the guide tube 111, is reduced to a minimum and in practice we have found that the structure gives very satisfactory results.

The phrase "at a substantial angle to the base plane" appearing in the claims is intended to define a position of the axis of the king-pin, fore and aft of the machine, approximating ninety degrees from the base plane, the base plane being the ground plane of the machine.

This application is a division of our application Serial No. 654,368, filed January 31, 1933.

We claim as our invention:

1. In a vehicle, the combination with a main frame, of a king-pin supported at its upper and lower ends from said frame in a plane parallel with the median vertical plane of the vehicle and with its axis inclined rearwardly slightly less than 90 degrees from the base-plane, a bearing sleeve axially slidable on said pin between its ends and forming a knuckle bearing having an axis inclined downwardly and laterally outwardly relative to the axis of the king-pin, a spring anchored on the main frame with its free end engaging said sleeve in the line of its sliding movement on the king-pin, and a wheel-spindle knuckle journaled on said sleeve about said inclined axis.

2. In a vehicle, the combination with a main frame of a king pin supported at its upper and lower ends from said frame in a plane parallel with the median vertical plane of the vehicle and with its axis inclined rearwardly slightly less than 90 degrees from the base-plane and its upper end to the rear of its lower end, a bearing sleeve axially slidable on said pin between its ends and forming a knuckle-bearing having an axis inclined downwardly and laterally outwardly relative to the axis of the king pin, a spring anchored on the main frame with its free end engaging said sleeve in the line of its sliding movement on the king pin, and a wheel-spindle knuckle journaled on said sleeve about said inclined axis.

3. In a vehicle, the combination with a main frame of a king pin supported at its ends from said frame in a plane parallel with the median vertical plane of the vehicle and with its axis inclined rearwardly slightly less than 90 degrees from the base-plane, a bearing sleeve axially slidable on said pin between its ends and forming a knuckle-bearing having an axis inclined downwardly and laterally outwardly relative to the axis of the king pin, a spring anchored on the main frame with its free end engaging said sleeve in the line of its sliding movement on the king pin, and a wheel-spindle knuckle journaled on said sleeve about said inclined axis, the wheel spindle being so set that the medial vertical plane of a wheel journaled thereon will intersect the ground laterally beyond the intersection of the inclined axis of the knuckle with the ground.

4. In a vehicle, the combination with a main frame of a king pin supported at its ends from said frame in a plane parallel with the median vertical plane of the vehicle and with its axis inclined rearwardly slightly less than 90 degrees from the base-plane and its upper end to the rear of its lower end, a bearing sleeve axially slidable on said pin between its ends and forming a knuckle-bearing having an axis inclined downwardly and laterally outwardly relative to the axis of the king pin, a spring anchored on the main frame with its free end engaging said sleeve in the line of its sliding movement on the king pin, and a wheel-spindle knuckle journaled on said sleeve about said inclined axis, the wheel spindle being so set that the medial vertical plane of a wheel journaled thereon will intersect the ground laterally beyond the intersection of the inclined axis of the knuckle with the ground.

5. In a vehicle, the combination with a main frame, of a pair of laterally-projecting flaring arms carried by said frame, a tubular king pin extending between the outer ends of said arms, a bearing sleeve axially slidable on said king pin between said arms and forming a knuckle bearing having an axis inclined downwardly and laterally outwardly relative to the axis of the king pin, a spring anchored on the main frame with its free end engaging said sleeve in the line of its sliding movement on the king pin, and a wheel-spindle knuckle journaled on said sleeve about said inclined axis.

6. In a vehicle, the combination with a main frame, of a pair of laterally-projecting flaring arms carried by said frame, a tubular king pin extending between the outer ends of said arms, a tie bolt extending between the outer ends of said arms through said pin, a bearing sleeve axially slidable on said king pin between said arms and forming a knuckle bearing having an axis inclined downwardly and laterally outwardly relative to the axis of the king pin, a spring anchored on the main frame with its free end engaging said sleeve in the line of its sliding movement on the king pin, and a wheel-spindle knuckle journaled on said sleeve about said inclined axis.

7. In a vehicle a steering-wheel axle structure comprising a firmly anchored substantially vertical guide rod, a sleeve slidably mounted on said guide rod and provided with an outwardly-extending arm, a king-pin mounted in said arm with the lower end of its axis outwardly displaced relative to the axis of the guide rod, a wheel-spindle yoke journaled upon said king pin and provided with an outwardly-projected wheel spindle, a wheel journaled on said spindle and spring means carried by the anchorage of the guide rod and connected with said sleeve.

8. In a vehicle a steering-wheel axle structure comprising a firmly anchored substantially vertical guide rod, a sleeve slidably mounted on said guide rod and provided with an outwardly-extending arm, a king-pin mounted in said arm with the lower end of its axis outwardly displaced relative to the axis of the guide rod, a wheel-spindle yoke journaled upon said king pin and provided with an outwardly-projected wheel spindle, a wheel journaled on said spindle and spring means carried by the anchorage of the guide rod and connected with said sleeve by a pivotal connection substantially midway between the axes of the guide rod and the king-pin.

9. In a vehicle a steering-wheel axle structure comprising a firmly anchored substantially vertical guide rod, a sleeve slidably mounted on said guide rod and provided with an outwardly-extending arm, a wheel-spindle yoke journaled upon said arm on an axis inclined to the axis of the guide rod and provided with an outwardly-projected wheel-spindle, a wheel journaled on said spindle, and spring means anchored on the guide rod support and connected to the said sleeve by a pivotal connection substantially midway between the axis of the guide rod and the axis of the journaled connection between the sleeve and wheel spindle yoke.

10. In a vehicle a steering-wheel axle structure comprising a firmly anchored substantially vertical guide rod, a sleeve slidably mounted on said guide rod and provided with an outwardly-extending arm, a wheel-spindle yoke journaled upon said arm on an axis inclined to the axis of the guide rod and provided with an outwardly-projecting wheel-spindle, a wheel journaled on said spindle, and spring means anchored on the guide rod support and connected to the said sleeve.

11. In a vehicle, the combination with a main frame, of a substantially vertical guide rod firmly anchored at its upper and lower ends upon the main frame, a sleeve slidably mounted on said guide rod between its anchorages, a spring mounted upon the main frame and yieldingly supporting said slidable sleeve, a wheel spindle carried by said slidable sleeve and pivotally associated therewith upon an axis inclined downwardly and laterally outwardly relative to the slide line of the sleeve.

12. In a vehicle, the combination with a main frame, of a substantially vertical guide rod firmly anchored at its upper and lower end upon the main frame, a sleeve slidably mounted on said guide rod between its anchorages, a spring mounted upon the main frame and yieldingly supporting said slidable sleeve, a wheel spindle carried by said slidable sleeve and pivotally associated therewith upon an axis inclined downwardly and laterally outwardly relative to the slide line of the sleeve, said axis intersecting the axis of the sleeve within the length of said sleeve.

HOWARD C. MARMON.
GEORGE H. FREERS.